(12) United States Patent
Adimatyam et al.

(10) Patent No.: US 9,282,368 B2
(45) Date of Patent: Mar. 8, 2016

(54) PARENTAL CONTROL SYSTEM USING MORE RESTRICTIVE SETTING FOR MEDIA CLIENTS BASED ON OCCURRENCE OF AN EVENT

(71) Applicant: Verizon Patent and Licensing Inc., Basking Ridge, NJ (US)

(72) Inventors: Venkata S Adimatyam, Irving, TX (US); Sameer Gavade, Irving, TX (US); Tariq Roshan, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 350 days.

(21) Appl. No.: 13/905,747

(22) Filed: May 30, 2013

(65) Prior Publication Data

US 2014/0359124 A1 Dec. 4, 2014

(51) Int. Cl.
*H04N 21/454* (2011.01)
*H04N 21/442* (2011.01)
*H04N 21/475* (2011.01)
*H04L 12/64* (2006.01)

(52) U.S. Cl.
CPC ...... *H04N 21/44222* (2013.01); *H04L 12/6418* (2013.01); *H04N 21/454* (2013.01); *H04N 21/4542* (2013.01); *H04N 21/4751* (2013.01); *H04N 21/4756* (2013.01)

(58) Field of Classification Search
CPC . H04N 7/163; H04N 5/4403; H04N 5/44543; H04N 21/43615; H04N 21/4532; H04N 21/44204; H04N 21/41407; H04N 21/44222; H04N 21/4756; H04N 21/4542; H04N 21/454; H04L 9/32; G06K 9/00369; G06F 21/305; G01S 5/0252

See application file for complete search history.

(56) References Cited

U.S. PATENT DOCUMENTS

| 8,843,953 | B1 * | 9/2014 | Dang et al. ............... 725/28 |
| 2009/0089826 | A1 * | 4/2009 | Card, II ............... 725/25 |
| 2009/0133051 | A1 * | 5/2009 | Hildreth ............... 725/28 |
| 2011/0219084 | A1 * | 9/2011 | Borra et al. ............... 709/206 |
| 2011/0237324 | A1 * | 9/2011 | Clavin et al. ............... 463/29 |
| 2011/0298596 | A1 * | 12/2011 | Warrick ............... 340/12.53 |
| 2011/0309933 | A1 * | 12/2011 | Marino ............... 340/539.32 |
| 2012/0324504 | A1 * | 12/2012 | Archer et al. ............... 725/30 |
| 2013/0040629 | A1 * | 2/2013 | Sprigg et al. ............... 455/419 |

* cited by examiner

*Primary Examiner* — Le H Luu

(57) ABSTRACT

A first media client may set a parental control feature of the first media client to a first setting. The first media client may determine an occurrence of an event associated with the parental control feature. The first media client may determine a second setting of a parental control feature of a second media client. The second media client may be different from the first media client. The first media client may determine that the second setting is a more restrictive setting relative to the first setting. The first media client may set the parental control feature of the first media client to the second setting based on the occurrence of the event and based on the second setting being the more restrictive setting.

20 Claims, 12 Drawing Sheets

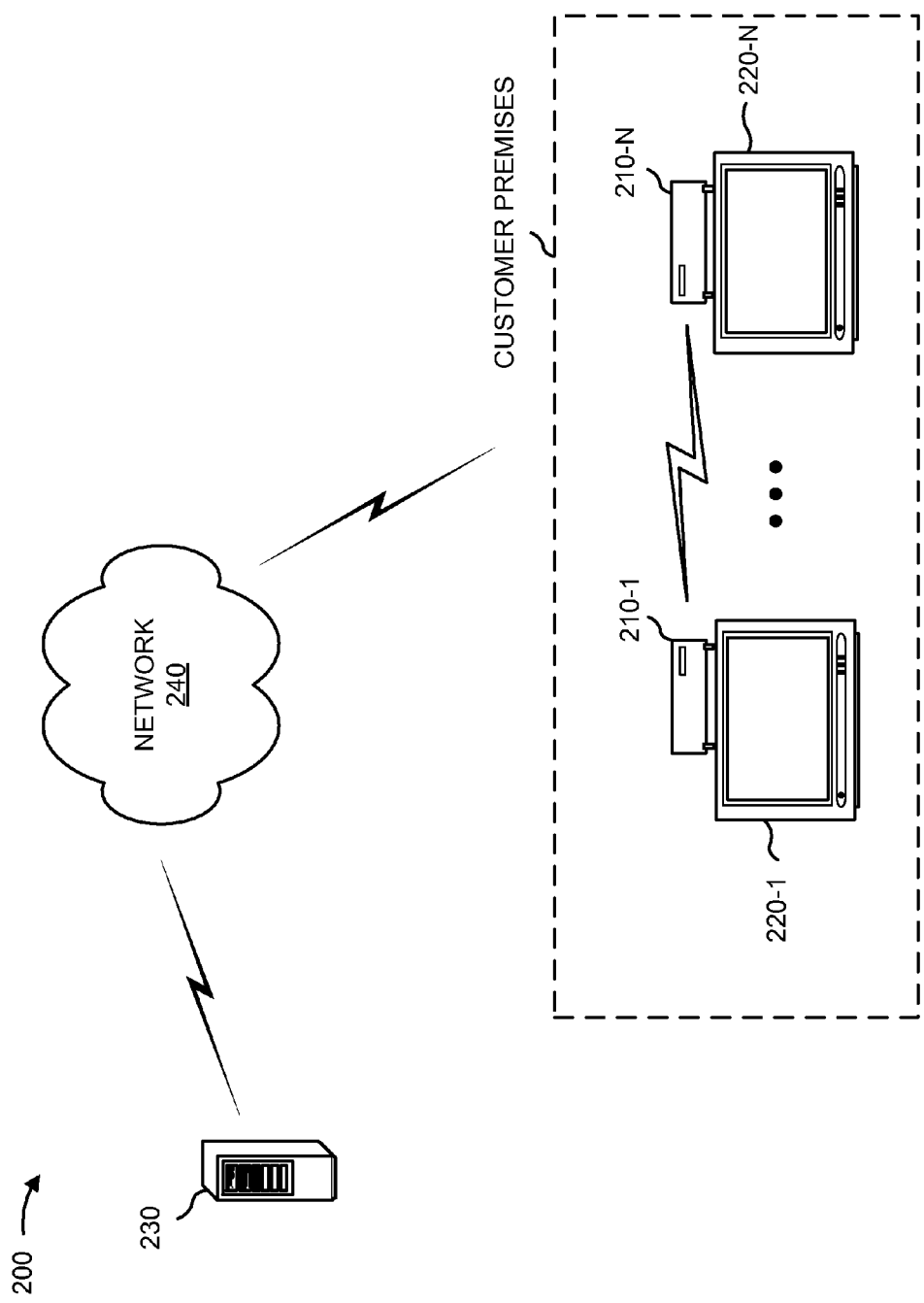

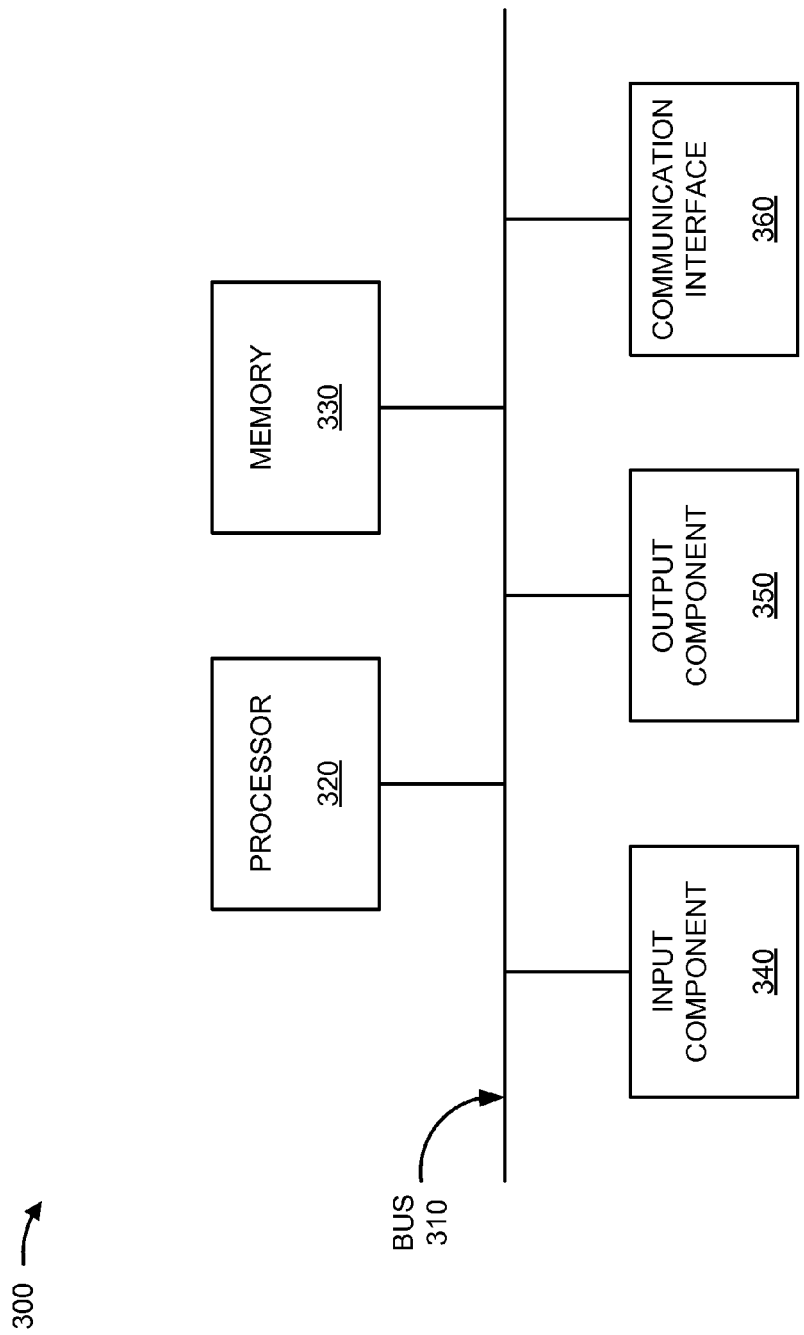

| DEVICE NAME 410 | NETWORK ADDRESS 420 | PARENTAL CONTROL SETTING 430 | TIME OUT EVENT 440 |
|---|---|---|---|
| LIVING ROOM | ADDRESS1 | MODERATE | INPUT FROM USER |
| JOHN'S ROOM | ADDRESS2 | AGES 2-5 | N/A |
| PARENT'S BEDROOM | ADDRESS3 | UNRESTRICTED | NO ACTIVITY FOR 1 HOUR |
| GUEST ROOM | ADDRESS4 | UNRESTRICTED | 1 HOUR |

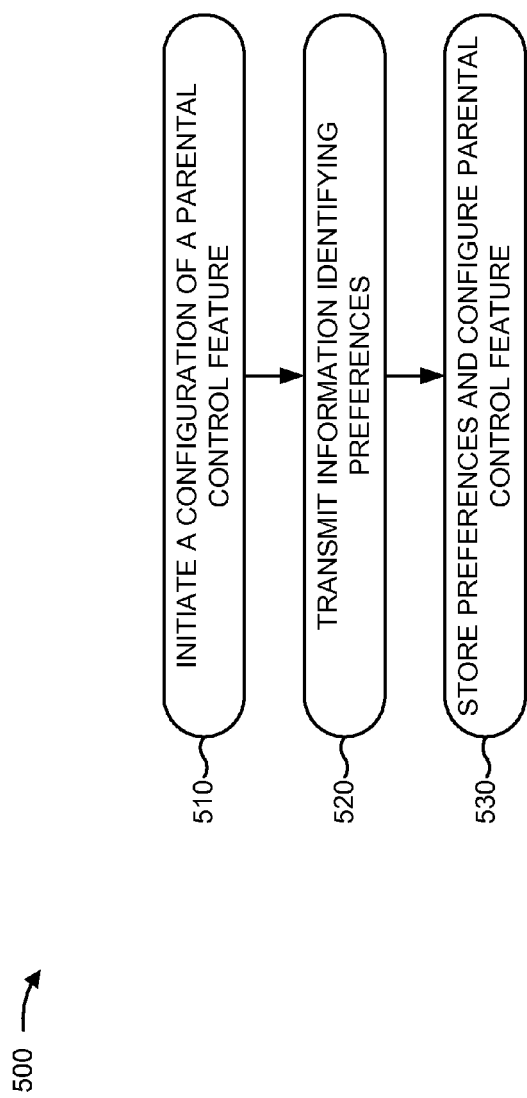

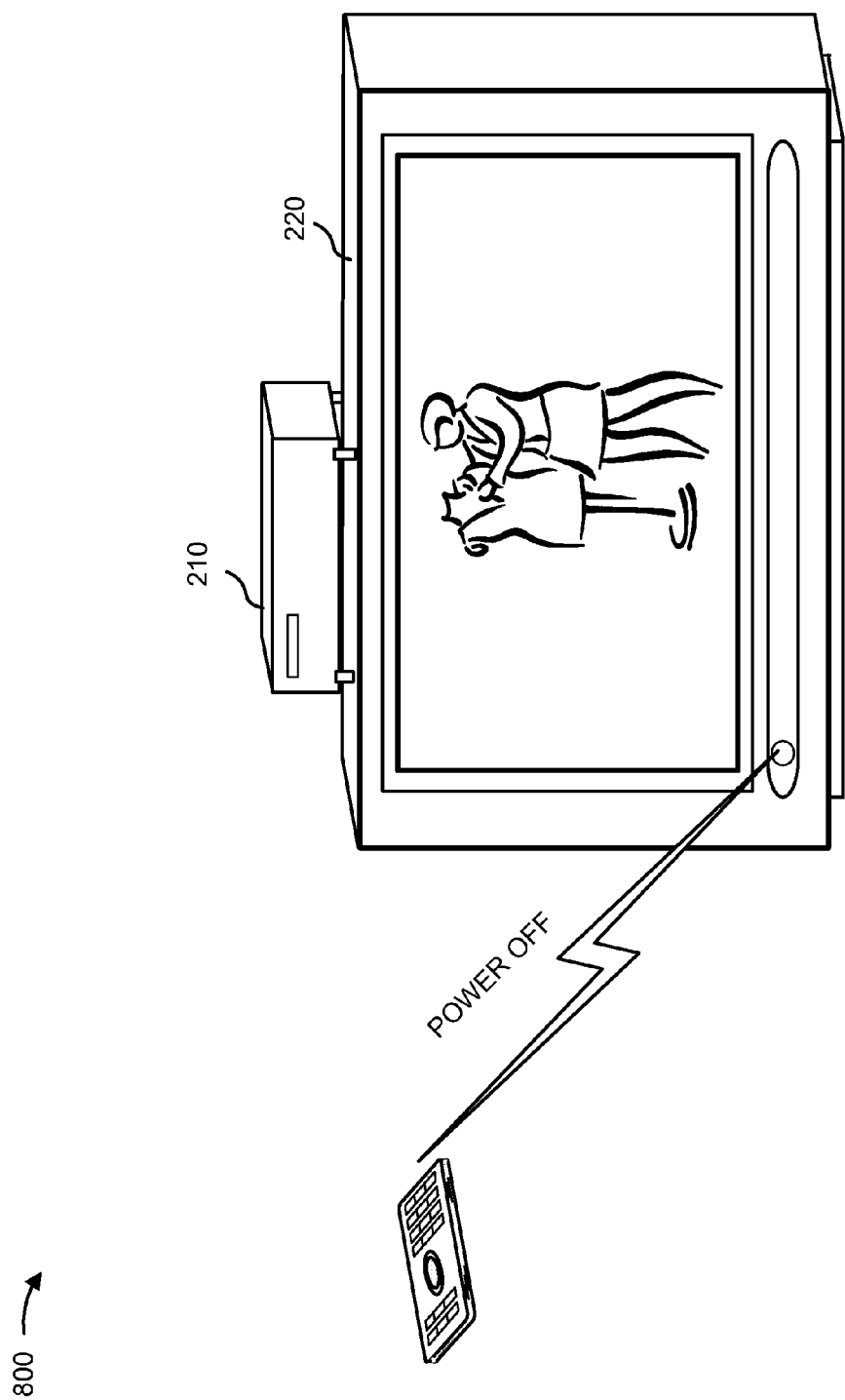

… (US 9,282,368 B2)

PARENTAL CONTROL SYSTEM USING MORE RESTRICTIVE SETTING FOR MEDIA CLIENTS BASED ON OCCURRENCE OF AN EVENT

BACKGROUND

A continually increasing number of multimedia options are being provided to customers. Unlimited access to these options may not be desirable for certain age groups. A parent may use a parental control feature to prevent a child from accessing individual devices or particular content that the parent deems inappropriate based on the age of the child.

BRIEF DESCRIPTION OF THE DRAWINGS

FIG. 2 is a diagram of an environment in which systems and/or methods, described herein, may be implemented;

FIG. 3 illustrates example components of a device that may be used within the environment of FIG. 2 according to one or more implementations described herein;

FIG. 4 is a diagram of an example data structure for storing information regarding a parental control feature;

FIG. 5 is a flow chart of an example process for configuring a parental control feature;

FIGS. 8A-8C are diagrams illustrating an example of the process described with respect to FIG. 7.

DETAILED DESCRIPTION OF PREFERRED EMBODIMENTS

The following detailed description refers to the accompanying drawings. The same reference numbers in different drawings may identify the same or similar elements.

Systems and/or methods described herein may support implementing a parental control feature on devices included in a home network. The parental control feature may be customized, by an administrator (e.g., a parent) for each user and/or each device included in the home network.

Figure 1A:
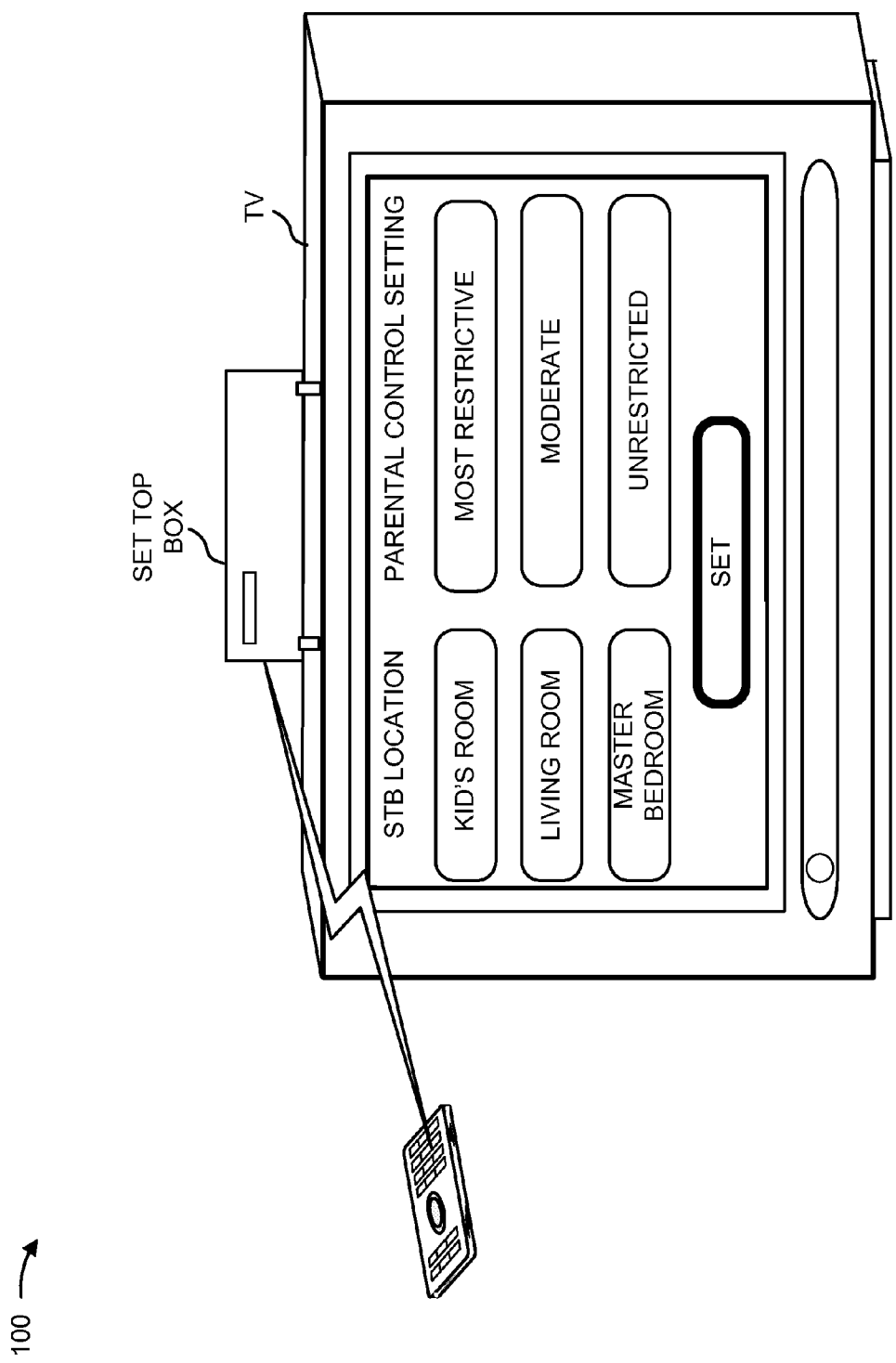
FIGS. 1A and 1B are diagrams illustrating an overview of a parental control system according to implementations described herein.
Figure 1B:
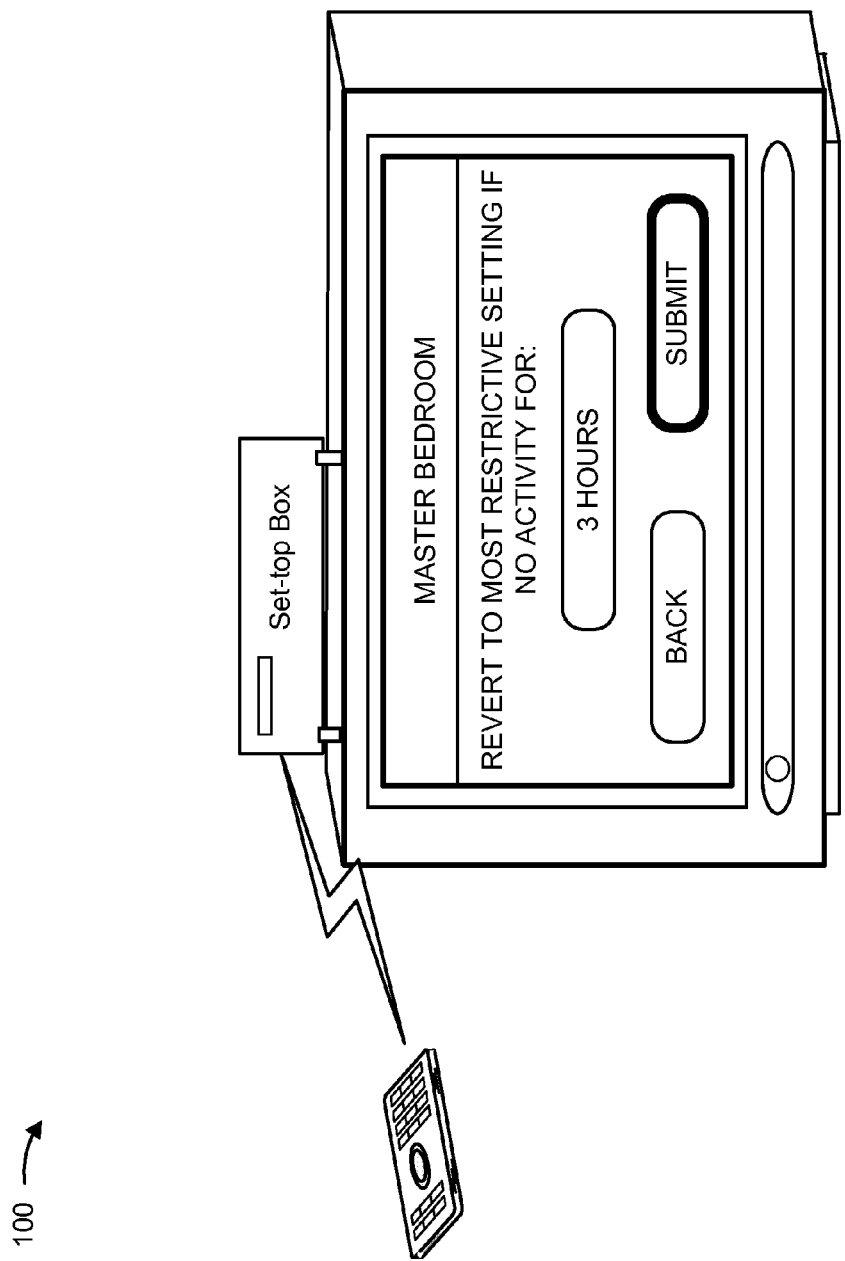

FIGS. 1A and 1B provide diagrams illustrating an overview of a parental control system according to implementations described herein. Referring to FIG. 1A, assume that a home network includes three set top boxes for viewing television programming in different locations within the home. Assume that a parent accesses a parental control feature via one of the set top boxes and configures the parental control feature for each of the three set top boxes. The parent may configure the parental control feature for the set top box located in the children's bedroom to a most conservative or restrictive setting to prevent the children from viewing age inappropriate content. The parent may configure the parental control feature for set top boxes located in the living room and the parent's bedroom to more liberal (e.g., less restrictive) settings. As shown in FIG. 1A, after configuring the parental control feature for the set top boxes, the parent selects a button for causing the parental control feature to be implemented at each of the set top boxes.

Referring to FIG. 1B, to prevent the children from circumventing the parental feature by viewing age inappropriate content, via the set top boxes located in the parent's bedroom, when the parent is not around, the parent may configure the parental control feature for the set top box located in the parent's bedroom to revert to a most restrictive setting if there is no activity at the set top box in the parent's bedroom for a particular period of time. As shown in FIG. 1B, the parental feature for the set top box in the parent's bedroom will automatically revert to the setting for the parental control feature for the set top box in the children's bedroom if there is no activity at the set top box in the parent's bedroom for a period of 3 hours.

FIG. 2 is a diagram of an environment 200 in which systems and/or methods described herein may be implemented. As shown in FIG. 2, environment 200 may include media clients 210-1 through 210-N (referred to collectively as media clients 210 and individually as media client 210), display devices 220-1 through 220-N (referred to collectively as display devices 220 and individually as display device 220), server device 230, and network 240. Devices of environment 200 may interconnect via wired connections, wireless connections, or a combination of wired and wireless connections.

Media client 210 may include a device capable of receiving, transmitting and/or processing multimedia content and providing the multimedia content to a user (e.g., via display device 220). Media client 210 may allow a user to provide input for interactive menus (e.g., to navigate menu displays or input data) and to alter programming and/or content provided by media client 210 to display device 220 based on a signal (e.g., a channel up or channel down signal) from, for example, a remote control (not shown).

Media client 210 may include a device capable of receiving, transmitting, and/or processing information (e.g., information regarding parental controls) to and/or from another media client 210 within a customer premises. Media client 210 may manage multiple user accounts and restrict/permit user input based on the user accounts. Media client 210 may also receive and/or send data (e.g., information regarding a setting of a parental control feature) to another media client 210 and/or server device 230. Examples of media client 210 may include a set-top box, a computer, a cable card, a gaming device, a portable electronic device, and/or other types of devices capable of receiving, transmitting and/or processing multimedia content and providing the multimedia content to a user.

Display device 220 may include any digital or analog display that is capable of presenting audio and/or video content provided by media client 210. Display device 220 may include technologies, such as cathode ray tube (CRT) displays, liquid crystal displays (LCDs), light-emitting diode (LED) displays, plasma displays, etc. In some implementations, media client 210 may be incorporated into display device 220. Examples of display device 220 may include a television, a computer monitor, and/or other types of devices capable of presenting audio and/or video content.

Server device 230 may include one or more server devices that gather, process, search, and/or provide information in a manner described herein. Examples of server device 230 may include a headend device that provides broadcast television programs and/or pay-per-view (PPV) events, a video-on-demand (VOD) device or another device that provides multimedia content upon request, and/or a program guide information server that provides information related to multimedia content available to media client 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Although FIG. 2 shows example components of environment 200, in some implementations, environment 200 may include fewer components, different components, differently arranged components, or additional components than those depicted in FIG. 2. In some implementations, one or more components of environment 200 may perform one or more tasks described as being performed by one or more other components of environment 200.

FIG. 3 illustrates example components of a device 300 that may be used within environment 200. Device 300 may correspond to media client 210, display device 220, and/or server device 230. In some implementations, media client 210, display device 220, and/or server device 230 may include one or more devices 300 and/or one or more components of device 300.

As shown in FIG. 3, device 300 may include bus 310, processor 320, memory 330, input device 340, output device 350, and communication interface 360. Bus 310 may include a path that permits communication among the components of device 300. Processor 320 may include a processor, a microprocessor, an application specific integrated circuit (ASIC), a field programmable gate array (FPGA), or another type of processor that interprets and executes instructions. Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a mechanism that permits an operator to input information to device 300, such as a control button, a keyboard, a keypad, a touch screen interface, a microphone, a camera, a video recorder, or another type of input device. Output device 350 may include a mechanism that outputs information to the operator, such as a light emitting diode (LED), a display, a speaker, or another type of output device. Communication interface 360 may include any transceiver-like mechanism that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. In some implementations, one or more components of device 300 may perform one or more tasks described as being performed by one or more other components of device 300.

FIG. 4 is a diagram of an example data structure 400 for storing information regarding a parental control feature. In some implementations, data structure 400 may be stored by media client 210. In some implementations, data structure 400 may be stored by another device that is accessible by media client 210 (e.g., server device 230). In some implementations, data structure 400 may be created based on the processing described in connection with FIG. 5.

As shown in FIG. 4, data structure 400 may include a device name field 410, a network address field 420, a parental control setting field 430, and a time out event field 440. In some implementations, data structure 400 may be associated with a particular media client 210. For example, media client 210 may store a separate data structure 400 for each media client 210 included in a customer premises.

Device name field 410 may store a device identifier and/or other information identifying a media client 210 and/or display device 220. For example, device name field 410 may store a unique sequence of characters, a name of a location (e.g., a name of a particular room or area within a customer premises) in which media client 210, and/or other information that can be used to uniquely identify a media client and/or a display device within a customer premises.

Network address field 420 may store information identifying a network address of media client 210. For example, network address field 420 may identify a media access control (MAC) address, an IP address, etc., associated with media client 210.

Parental control setting field 430 may store information for determining whether media client 210 is to provide particular content. For example, parental control setting field 430 may store information identifying content ratings (e.g., ratings from the Motion Picture Association of America (MPAA), Television Parental Guidelines system, etc.) of content that is and/or is not permitted to be provided by media client 210, a pre-defined parental control setting (e.g., an unrestricted setting, a restricted setting, a conservative setting, a moderate setting, a liberal setting, an age group setting (e.g., ages 2-5), etc.) associated with preventing particular content from being provided by media client 210, information identifying one or more genres (e.g., drama, horror, comedy, educational programming, children's programming, etc.) of content is and/or is not to be provided by media client 210, and/or other types of information for determining whether media client 210 is to provide particular content.

Time out event field 440 may store information for determining an occurrence of a time out event. Upon occurrence of a time out event, media client 210 may modify a parental control setting as further described in connection with FIG. 7. For example, time out event field 440 may store information indicating that a time out event occurs when media client 210 receives a particular input from a user, when display device 220 and/or media client 210 has been turned off, when media client 210 has been idle (e.g., has not received any input from a user for a particular period of time), after expiration of a particular period of time from authenticating a particular user, and/or other information for determining an occurrence of a time out event.

Although FIG. 4 shows example fields of data structure 400, in some implementations, data structure 400 may include additional fields, different fields, or fewer fields than those depicted in FIG. 4.

FIG. 5 is a flow chart of an example process 500 for configuring a parental control feature. In some implementations, process 500 may be performed by media client 210. In other implementations, one or more blocks of process 500 may be performed by one or more devices instead of, or possibly in conjunction with, media client 210.

As shown in FIG. 5, process 500 may include initiating a configuration of a parental control feature (block 510). For example, the user may use a remote control to cause media client 210 to provide a list of menu items for display on display device 220. The list of menu items may include an item for configuring a parental control feature of media client 210. The user may select the item to initiate a configuration of the parental control feature.

In some implementations, media client 210 may attempt to authenticate the user. For example, in response to the user selecting the item, media client 210 may request that the user enter a personal identification number. The user may enter the personal identification number by, for example, pressing one or more keys on the remote control. Media client 210 may compare the entered personal identification number to a stored personal identification number. Media client 210 may authenticate the user and provide the user interface for configuring the parental control feature when the entered personal identification number matches the stored personal identification number. If the entered personal identification number does not match the stored personal identification number, media client 210 may cause a notification to be displayed on display device 220 indicating that the entered personal identification number is incorrect and/or that the user is prohibited from accessing the parental control feature.

In some implementations, the user may initiate the parental control feature and may identify one or more media clients 210 associated with the parental control feature and/or one or more preferences relating to configuring the parental control feature for each of the one or more media clients 210. For example, the user may have multiple media clients 210 located in different areas of the customer's premises (e.g., the customer's home). The user may initiate the parental control feature and identify one or more preferences relating to configuring the parental control feature for each media client 210. In some implementations, the user may identify the same one or more preferences for each of the multiple media clients 210. In some implementations, the user may identify one or more different preferences for one or more of the multiple media clients 210.

In some implementations, the user may identify the one or more preferences using one or more elements of a user interface provided by media client 210. The one or more elements may include, for example, one or more text input elements, one or more drop down menu elements, one or more checkbox elements, one or more radio button elements, and/or any other types of elements that may be used to receive information from the user.

In some implementations, the one or more preferences may include a preference of the user with respect to a particular rating or group of ratings of content. For example, the preference may identify ratings (e.g., R, PG-13, PG, G, TV MA, TV Y, TV G, etc.) of content that is and/or is not to be provided by media client 210.

In some implementations, the one or more preferences may include a preference of the user with respect a particular type of content. For example, the preference may identify content labels (e.g., fantasy violence (FV), violence (V), sexual situations (S), coarse or crude language (L), suggestive dialog (D), etc.), keywords (e.g., boxing, MMA, wrestling, etc.), and/or types of content (horror, romance, sports, etc.) that is and/or is not to be provided by media client 210.

In some implementations, the one or more preferences may include a preference of the user with respect to an occurrence of a time out event. The user may provide information for determining whether media client 210 is to modify a setting of a parental control feature upon an occurrence of a time out event and/or information for determining the occurrence of the time out event. For example, the preference may include information indicating that media client 210 is to enable a time out event feature and that media client 210 is to determine an occurrence of a time out event based on media client 210 being idle for a particular amount of time (e.g., 3 hours), media client 210 and/or display device 210 being turned off, receiving information identifying an occurrence of a time out event associated with another media client 210, receiving information identifying a setting of the parental control feature that is more restrictive/conservative than a current setting of the parental control feature, receiving a signal, associated with a user-initiated time out event, from another device (e.g., a remote control, another media client 210, and/or server device 230).

In some implementations, the one or more preferences may include a preference of the user with respect to an action to be taken in response to an occurrence of a time out event. For example, the preference may identify an action to be performed by media client 210 when an occurrence of a time out event is detected. The action may include detecting other media clients 210, determining a setting of the parental control feature for the other media clients 210, determining a most restrictive setting of the parental control feature, modifying a setting of the parental control feature, and/or changing the setting of the parental control feature to a most restrictive/conservative setting.

In some implementations, a type of the account, of the user, associated with the parental control feature may determine preferences that the user is able to identify. For example, the parental control feature may enable the user to identify only a particular group of the above preferences and/or identify additional preferences based on the type of the account with which the user is associated. For example, a user having a premium level account may be able to initiate the configuration for multiple media clients 210 via a single media client 210 while a user having a non-premium level account may have to initiate the configuration of each of the media clients 210 at the particular media client 210.

In some implementations, the parental control feature may analyze information relating to media client 210 and/or a user, associated with media client 210, to determine the one or more preferences of the user relating to media client 210 providing content. For example, the information relating to media client 210 may include information identifying media client 210 within a customer premises. Based on the information identifying media client 210, media client 210 may set one or more preferences of the user to a particular setting. As an example, assume that the information relating to media client 210 includes information indicating that media client 210 is located in a child's bedroom. Media client 210 may set one or more preferences of the user to a setting that prevents mature content from being provided via media client 210.

Process 500 may include transmitting information identifying preferences (block 520). In some implementations, media client 210 may transmit information identifying the one or more preferences to another media client 210 and/or server device 230. The other media client 210 and/or server device 230 may receive the information identifying the one or more preferences and may store the information identifying the one or more preferences in a memory. For example, the user may identify one or more preferences relating to configuring the parental control feature for media client 210 and one or more preferences relating to configuring the parental control feature for the other media client 210. Media client 210 may transmit information identifying the one or more preferences relating to configuring the parental control feature of media client 210 and/or the one or more preferences relating to configuring the parental control feature of the other medial client 210 to the other media client 210 and/or server device 230. The other media client 210 and/or server device 230 may store the information identifying the one or more preferences relating to configuring the parental control feature of media client 210 and/or the one or more preferences relating to configuring the parental control feature of the other medial client 210 in a data structure, such as, for example, data structure 400.

Process 500 may include storing preferences and configuring the parental control feature (block 530). For example, a user, of media client 210, may cause media client 210 to store all or a portion of the preferences. In some implementations, media client 210 may store all or a portion of the preferences in a memory associated with media client 210. In some implementations, the parental control feature of media client 210 may be configured based on media client 210 storing all or a portion of the preferences. In some implementations, media client 210 may store all or a portion of the preferences in a data structure, such as, for example, data structure 400.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
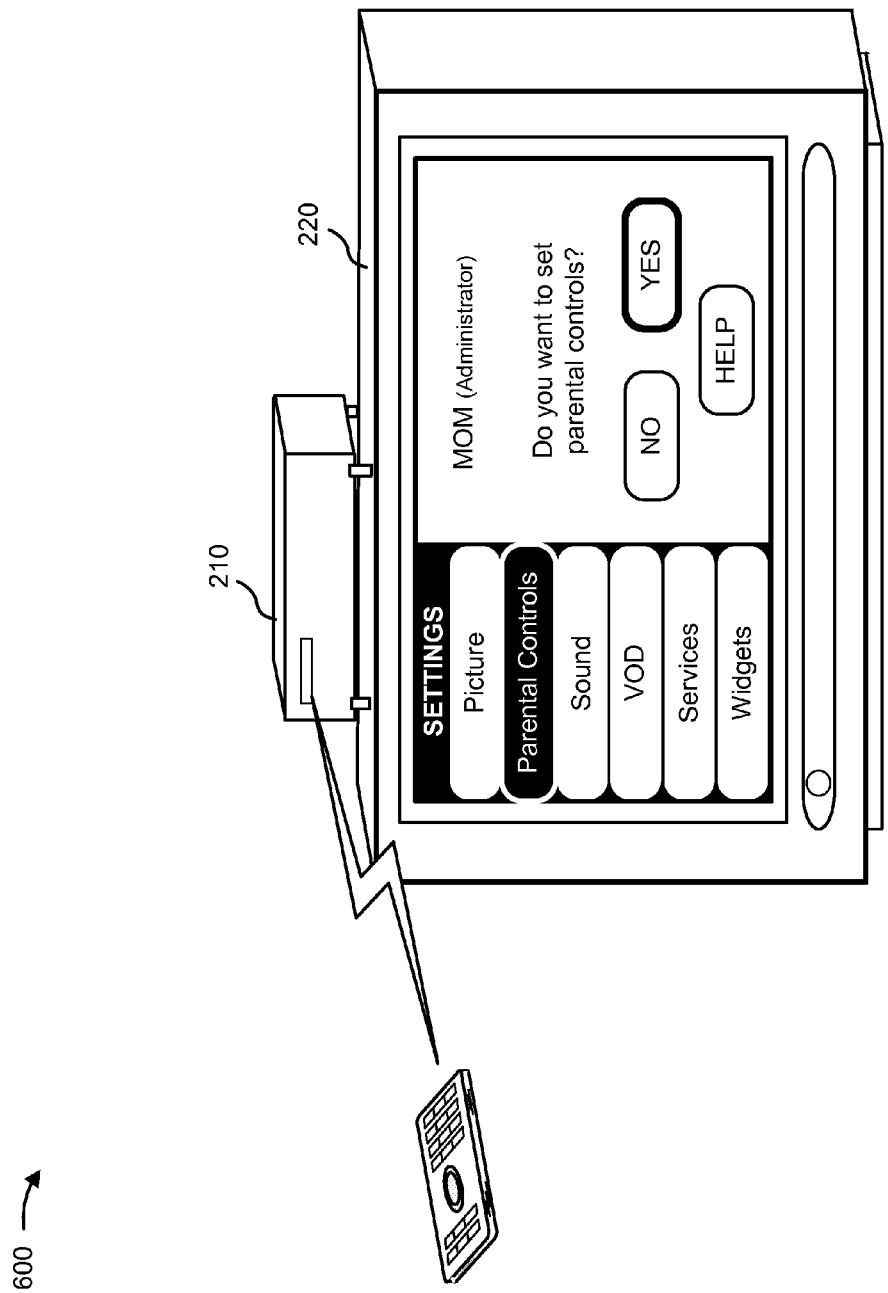
FIGS. 6A and 6B are diagrams illustrating an example of the process described with respect to FIG. 5.
Figure 6B:
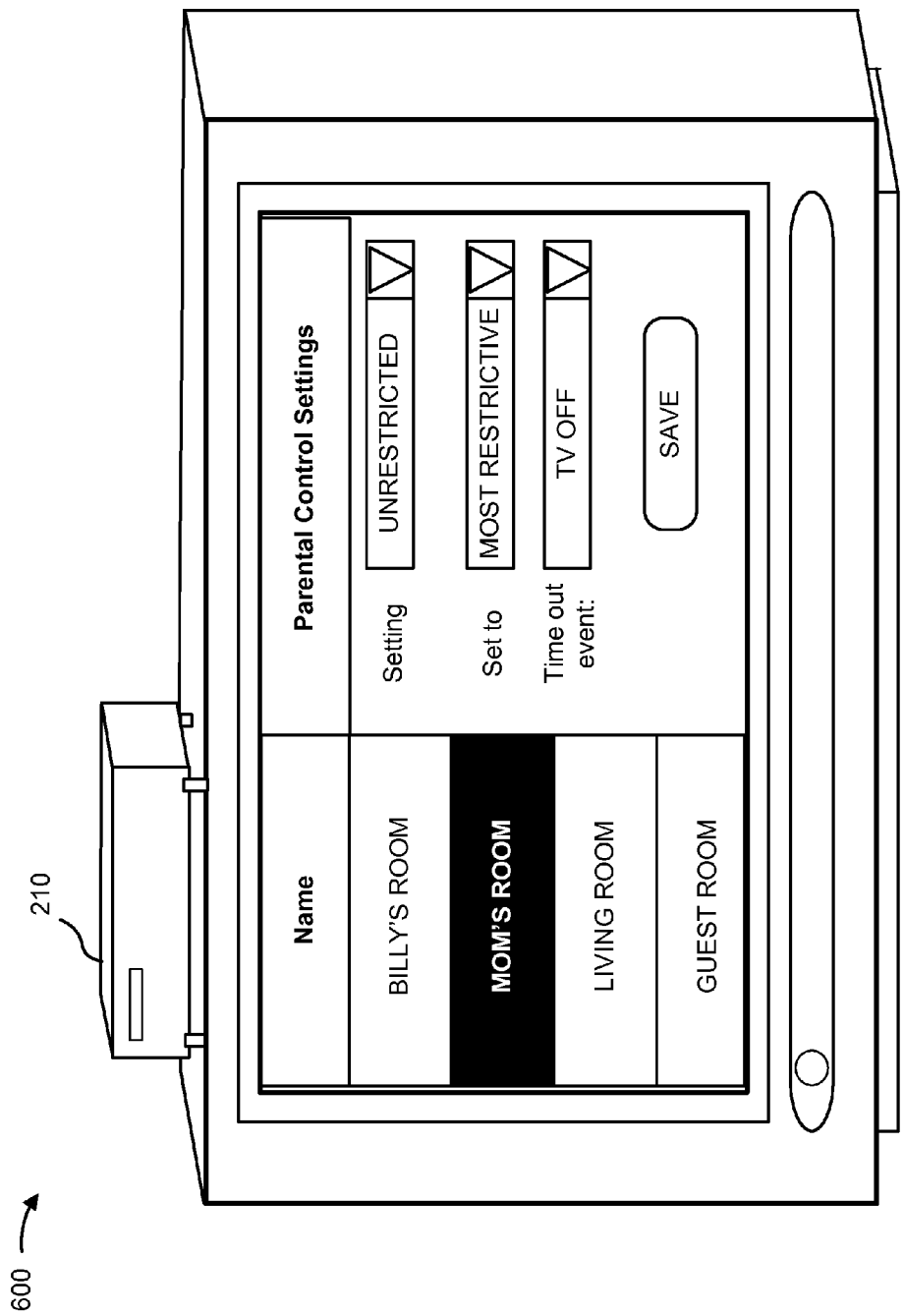

FIGS. 6A and 6B illustrate an example 600 of the process described above with respect to FIG. 5. For example 600, assume that a mom wants to configure a parental control feature for multiple media clients 210 located in her home. Further, assume that the mom has accessed a user interface for configuring various settings associated with the media clients 210 and has used a remote control to highlight an option for configuring a parental control feature. Referring now to FIG. 6A, in response to the mom highlighting the option for configuring the parental control feature, media client 210 provides a user interface that allows the mom to access a user interface for configuring the parental control feature. As shown in FIG. 6A, the mom uses the remote control to select the option "YES."

For FIG. 6B, assume that in response to the mom selecting the option "YES," media client 210 provides the user interface for configuring the parental control feature and that the mom has used the remote control to configure the parental control feature for the media client 210 located in her room. As shown in FIG. 6B, the mom has set the parental control feature to allow all content to be provided via the media client 210 located in her room. Further, the mom has set the parental control feature to revert to a most restrictive setting, of the settings for the media clients 210 located in her room, Billy's room, the living room, and the guest room, upon the television connected to the media client 210 located in her room being turned off. The mom may select the option "SAVE" to configure the parental control feature for the media client 210 located in her room. The mom may then use highlight another location to configure the parental control feature for the media client 210 associated with that location.

As indicated above, FIGS. 6A and 6B are provided merely as an example. Other examples are possible and may differ from what was described with regard to FIGS. 6A and 6B.

Figure 7:
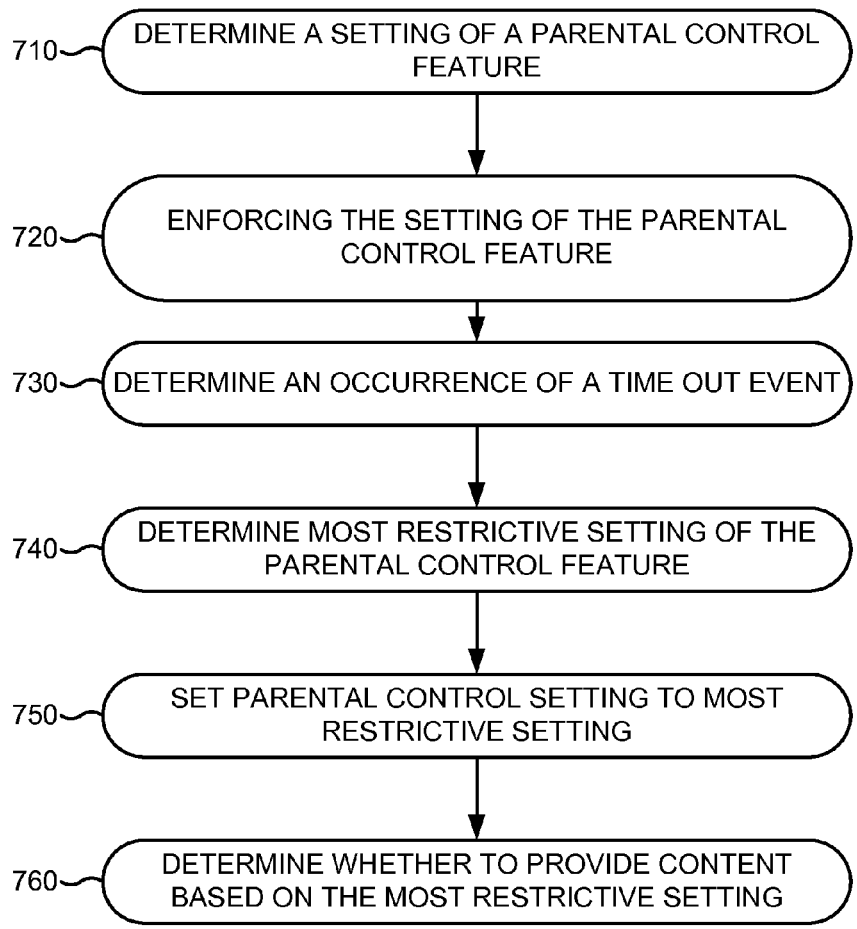
FIG. 7 is a flow chart of an example process for implementing a parental control feature.

FIG. 7 is a flow chart of an example process 700 for implementing a parental control feature. In some implementations, process 700 may be performed by media client 210. In some implementations, one or more blocks of process 700 may be performed by one or more devices instead of, or possibly in conjunction with, media client 210.

As shown in FIG. 7, process 700 may include determining a setting of a parental control feature (block 710). For example, media client 210 may provide a list of programs to a user (e.g., in response to a command from the user) via display device 220 and the user may select one of the listed programs using, for example, a remote control. Media client 210 may access preference information (e.g., information stored in data structure 400) associated with a parental control feature of media client 210. Media client 210 may determine a setting of the parental control feature based on the preference information.

Process 700 may include enforcing the setting of the parental control feature (block 720). For example, in response to the user selecting one of the listed programs, media client 210 may determine whether to provide the selected program to the user based on the setting of the parental control feature. In some implementations, the setting of the parental control feature may identify prohibited content. For example, the setting of the parental control feature may identify a group of content ratings (e.g., content rated R, PG-13, TV-M, etc.) of content that is not to be provided by media client 210. Media client 210 may determine a content rating of the selected program. Media client 210 may determine not to provide the selected content when the content rating of the selected program is included in the group of content ratings.

Process 700 may include determining an occurrence of a time out event (block 730). For example, media client 210 may access preference information (e.g., information stored in data structure 400) associated with configuring the parental control feature of media client 210. The preference information may include information for determining an occurrence of a time out event. Media client 210 may determine that a time out event has occurred based on the information.

In some implementations, the information for determining the occurrence of the time out event may include information identifying a particular event. The particular event may include media client 210 being idle (e.g., media client 210 has not received an input from a user, no activity has occurred at media client 210, etc.) for a particular amount of time, a particular amount of time elapsing, a particular amount of time elapsing since a user associated with an administrator account (e.g., a parent) has been authenticated (e.g., entered a personal identification number, password, etc.), a particular time of day (e.g., 8:00 pm, between 8:00 am and 5:00 pm, etc.), a particular day of week, a user turning off media client 210 and/or display device 220, media client 210 tuning to a particular channel (e.g., a channel for providing video on demand, a movie channel (e.g., HBO, Showtime, etc.), etc.), another media client 210 modifying a setting of a parental control feature to a particular setting (e.g., a most restrictive setting), a user attempting to access the parental control feature entering an incorrect personal identification number and/or an incorrect password a particular number of times, and/or information identifying other types of events. Media client 210 may determine that a time out event has occurred based on an occurrence of the particular event.

Process 700 may include determining a most restrictive setting of the parental control feature (block 740). For example, media client 210 may access preference information associated with the user and/or media client 210. Media client 210 may determine a most restrictive setting based on information included in the preference information. In some implementations, the preference information may identify multiple settings for parental control features associated with one or more media clients 210. Media client 210 may determine a most restrictive setting of the multiple settings.

For example, the multiple settings may include an unrestricted setting for allowing all content to be provided by media client 210, a moderate setting for preventing a first group of content from being provided by media client 210, and a restricted setting for preventing a second group of content from being provided by media client 210. Media client 210 may determine that the second group of content (e.g., content rated PG) prevents media client 210 from providing the second group of content and from providing the first group of content (e.g., content rated R). Media client 210 may determine that the restricted setting is the most restrictive setting based on the second group of content preventing media client 210 from providing content included in the second group of content and from providing content included in the first group of content.

In some implementations, media client 210 may determine that a particular setting, of the multiple settings, prohibits a widest range of content from being provided and/or is associated with a youngest age group of users. Media client 210 may determine that the particular setting is the most restrictive setting based on the particular setting prohibiting the widest range of content from being provided and/or being associated with the youngest age group of users.

In some implementations, media client 210 may determine that the preference information identifies a particular type of content (e.g., graphic violence (V), explicit sexual activity (S), crude indecent language (L), suggestive dialog (D), etc.), etc. Media client 210 may determine the most restrictive setting for preventing the particular type of content from being provided.

In some implementations, media client 210 may determine a most restrictive setting of the parental control feature from a group of settings associated with multiple media clients 210. For example, media client 210 may be included in a home network that includes another media client 210. Media client 210 may determine a setting of a parental control feature of the other media client 210. Media client 210 may determine that the setting of the parental control feature of the other media client 210 is more restrictive than the setting of the parental control feature of media client 210.

In some implementations, media client 210 may determine the setting of the parent control feature for the other media client 210 based on information received from another device (e.g., the other media client 210 and/or server device 230). For example, each media client 210 associated with a particular user and/or a particular customer premises (e.g., a particular home network) may send parental control feature information to other media clients 210 associated with the particular user and/or the particular customer premises. The parent control feature information may include information identifying a setting of the parental control feature of the media client 210 sending the parental control information. Each media client 210 may send the parental control information periodically, upon determining an occurrence of a time out event, and/or upon a user changing one or more portions of preference information related to the parental control feature of the media client 210 sending the parental control information.

In some implementations, media client 210 may determine a most restrictive setting based on preference information of the user. For example, media client 210 may access preference information associated with the user. The preference information may include information for determining the most restrictive setting. In some implementations, the information for determining the most restrictive setting may include information identifying a particular media client 210. Media client 210 may determine the most restrictive setting based on a setting of the parental control feature of the particular media client 210.

In some implementations, the information for determining the most restrictive setting may identify a particular setting, of a group of predetermined settings, of the parental control feature. For example, the parental control feature may include a set of predetermined settings targeted to different groups of users (e.g., a set of predetermined settings that restricts content based on an age of a user). The information for determining the most restrictive setting may identify a predetermined setting targeted to a particular group of users (e.g., a predetermined setting targeted to a youngest age group of users).

Process 700 may include setting the setting of the parental control feature to the most restrictive setting (block 750) and determining whether to provide content based on the most restrictive setting (block 760). For example, media client 210 may set the setting of the parental control feature to the most restrictive setting based on the occurrence of the time out event. In some implementations, when a user subsequently selects a program, media client 210 may determine whether to provide the selected program based on the most restrictive setting. In some implementations, media client 210 may determine the occurrence of an event while providing particular content for display via display device 220. Based on setting the parental control feature to the most restrictive setting, media client 210 may determine to stop providing the particular content.

In some implementations, media client 210 may provide a notification, via, for example, display device 220, that indicates that the user is prohibited from viewing a selected program, information regarding the occurrence of the time out event, and/or information regarding the setting of the parental control feature to the most restrictive setting. In some implementations, the notification may allow the user to enter a personal identification number and/or password for viewing the selected program and/or reverting the setting of the parental control feature to a previous setting.

In some implementations, media client 210 may cause a parental control feature of another media client 210 to be set to the most restrictive setting based on setting the parental control feature to the most restrictive setting. For example, a customer premises may include multiple media clients 210 interconnected via a home network. In response to setting the parental control feature of media client 210 to the most restrictive setting, media client 210 may determine that a parental control feature of one or more media clients 210, of the multiple media clients 210, are set to a less restrictive setting than the most restrictive setting. Media client 210 may send a message to the one or more media clients 210. The message may include information identifying the occurrence of the time out event and/or information identifying the most restrictive setting. The one or more media clients 210 may receive the message and may set the parental control feature to the most restrictive setting.

While FIG. 7 shows process 700 as including a particular quantity and arrangement of blocks, in some implementations, process 700 may include fewer blocks, additional blocks, or a different arrangement of blocks. Additionally, or alternatively, some of the blocks may be performed in parallel.

Figure 8B:
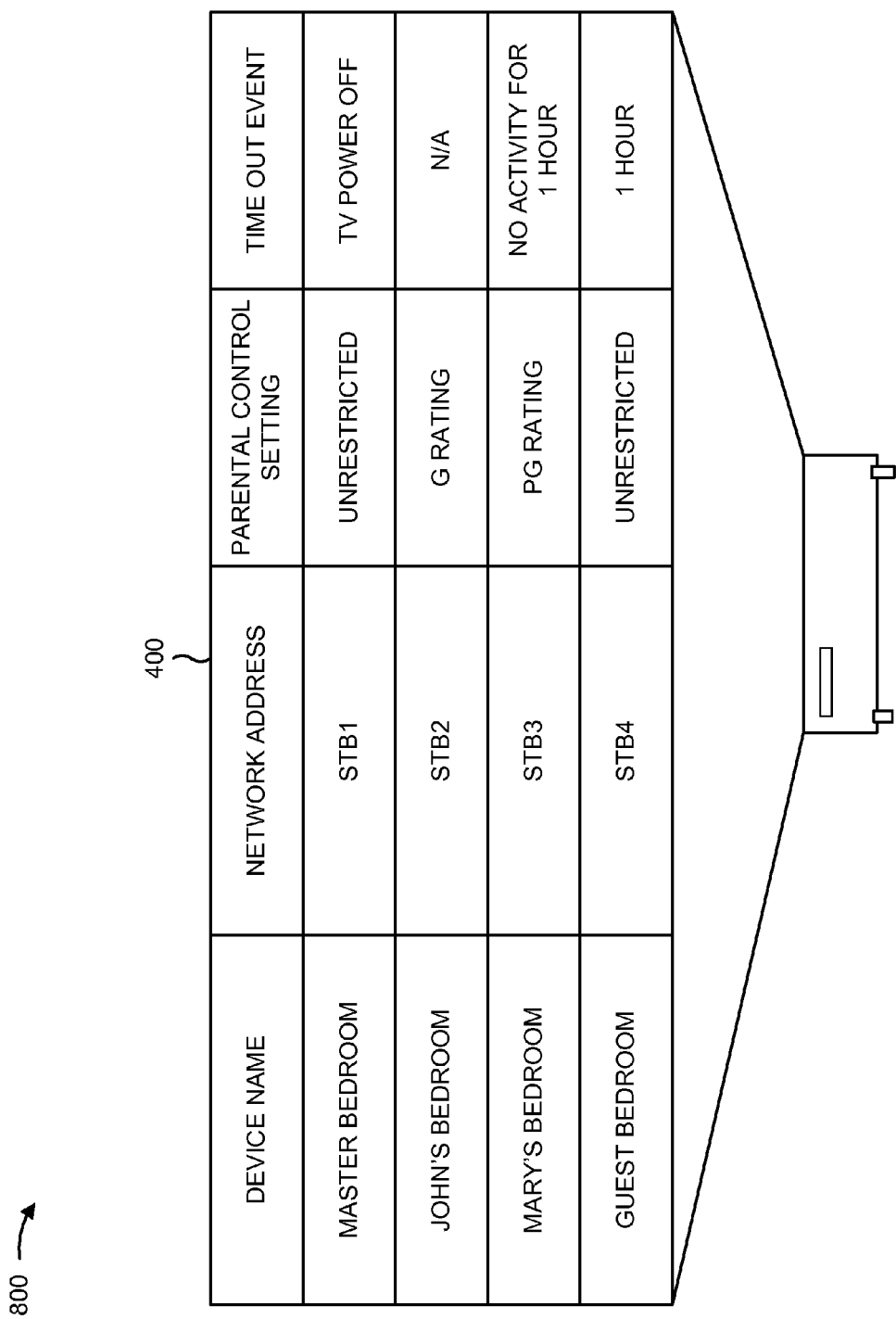
Figure 8C:
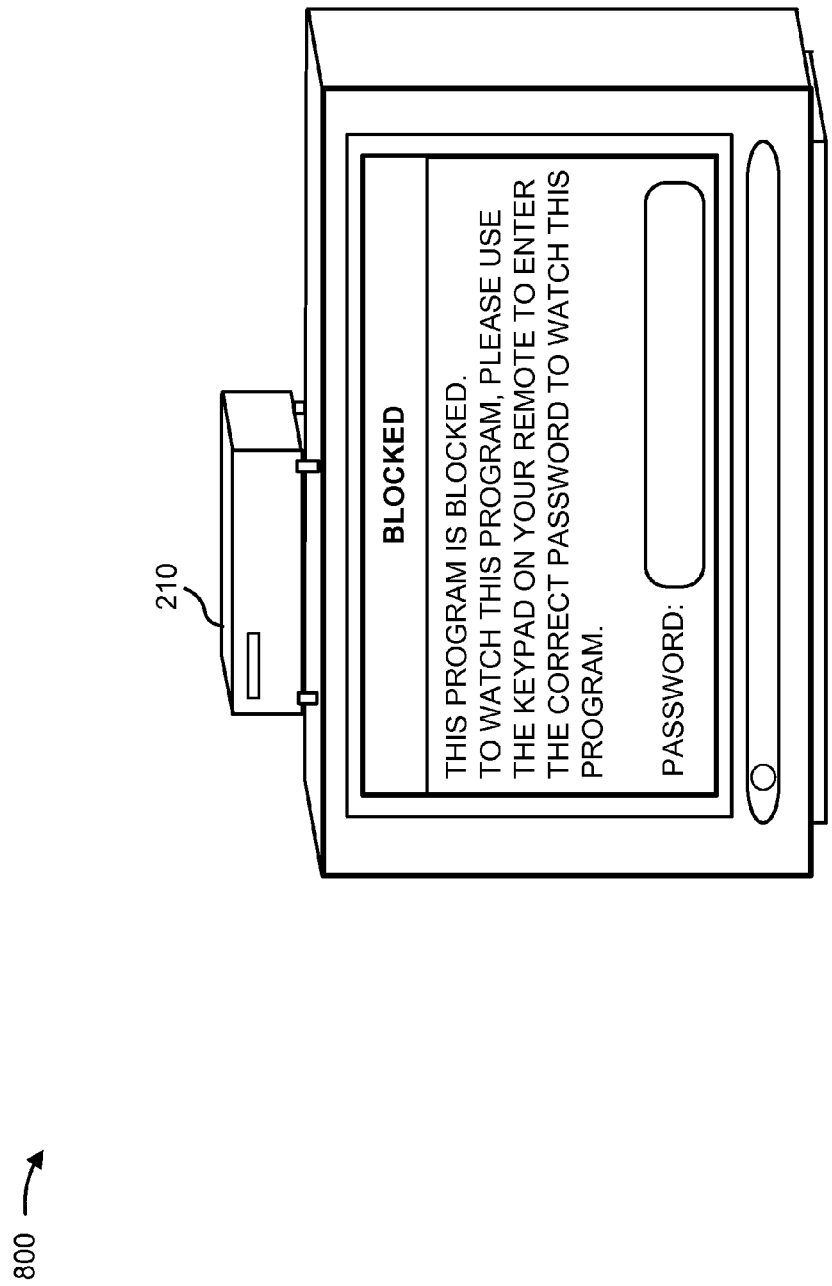

FIGS. 8A-8C illustrate an example 800 of the process described above with respect to FIG. 7. For example 800, assume that a parent is watching a television program provided by a set top box connected to a television located in the parent's bedroom. Further, assume that the set top box is associated with a particular name based on a location of the set top box, and that the parent has set a parental control feature to an unrestricted setting. Assume that, based on the unrestricted setting, the set top box allows all content to be provided and displayed via the television. Assume further that the parent has two children, John and Mary, and that the parent desires to prevent John and Mary from watching inappropriate content on the parent's television when the parent is not around. Referring now to FIG. 8A, the parent may be finished viewing the television program and uses a remote control to turn the television off.

Referring now to FIG. 8B, the set top box may access data structure 400 to determine an occurrence of a time out event. The set top box may identify information related to the parental control feature of the set top box based on the particular name associated with the set top box. Based on the identified information, the set top box may determine that the parent turning the television off constituted an occurrence of a time out event and that the set top box should change the setting of the parental control feature to a most restricted setting (e.g., from UNRESTRICTED to G RATING).

Referring now to FIG. 8C, assume that Mary has come into the parent's bedroom to watch a particular show that her parent does not believe is appropriate for her on her parent's television. Further, assume that Mary has used the remote control to cause the set top box to tune to a particular channel on which the show is being broadcast. As shown in FIG. 8C, based on the parental control setting being set to the most restricted setting, the set top box blocks Mary from watching the show and causes a notification to be displayed that informs Mary that the show is blocked and that Mary can unblock the show if she enters the correct password.

As indicated above, FIGS. 8A-8C are provided merely as an example. Other examples are possible and may differ from what was described with regard to FIGS. 8A-8C.

The foregoing description provides illustration and description, but is not intended to be exhaustive or to limit the embodiments to the precise form disclosed. Modifications and variations are possible in light of the above teachings or may be acquired from practice of the implementations.

As used herein, the term device is intended to be broadly interpreted to refer to hardware or a combination of hardware and software, such as software executed by a processor.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
    setting, by a first media client, a parental control feature of the first media client to a first setting;
    determining, by the first media client, an occurrence of an event associated with the parental control feature;
    determining, by the first media client, a second setting of a parental control feature of a second media client,
        the second media client being different from the first media client;
    determining, by the first media client, that the second setting is a more restrictive setting relative to the first setting; and
    setting, by the first media client, the parental control feature of the first media client to the second setting based on the occurrence of the event and based on the second setting being the more restrictive setting.

2. The method of claim 1, where determining the occurrence of the event includes:
    determining that the first media client has been idle for a particular amount of time; and
    determining the occurrence of the event based on the first media client having been idle for the particular amount of time.

3. The method of claim 1, where determining the occurrence of the event includes:
    determining that a display device, associated with the first media client, has been turned off.

4. The method of claim 1, where the first setting is associated with preventing a first group of content from being provided and the second setting is associated with a second group of content from being provided; and
    where determining that the second setting is the more restrictive setting includes:
        determining that the second setting is associated with preventing the first group of content and the second group of content from being provided, and
        determining that the second setting is the more restrictive setting relative to the first setting based on the second setting being associated with preventing the first group of content and the second group of content from being provided.

5. The method of claim 1, where determining that the second setting is the more restrictive setting includes:

determining that the second setting is associated with preventing a wider range of content from being provided than the first setting.

6. The method of claim 1, where determining that the second setting is the more restrictive setting includes:
   accessing preference information associated with the parental control feature,
   determining a particular type of content associated with the more restrictive setting based on the preference information,
   determining that the second setting is associated with preventing the particular type of content from being provided, and
   determining that the second setting is the more restrictive setting relative to the first setting based on the second setting being associated with preventing the particular type of content from being provided.

7. The method of claim 1, where determining that the second setting is the more restrictive setting includes:
   determining that the first setting is associated with a first age group of users,
   determining that the second setting is associated with a second age group of users,
      the second age group being younger than the first age group, and
   determining that the second setting is the more restrictive setting relative to the first setting based on the second setting being associated with the second age group of users.

8. A first device comprising:
   a processor to:
      set a parental control feature of the first device to a first setting;
      obtain information identifying a second setting of a parental control feature of a second, different device;
      determine that the second setting corresponds to a more restrictive setting relative to the first setting;
      determine an occurrence of an event associated with the parental control feature; and
      set, based on the occurrence of the event and based on the second setting corresponding to the more restrictive setting, the parental control feature of the first device to the second setting.

9. The first device of claim 8, where, when determining the occurrence of the event, the processor is to:
   determine that no activity has occurred at the first device during a particular period of time; and
   determine the occurrence of the event based on no activity having occurred at the first device during the particular period of time.

10. The first device of claim 8, where, when determining the occurrence of the event, the processor is to:
   determine that a display device, associated with the first device, has been turned off, and
   determine the occurrence of the event based on the display device having been turned off.

11. The first device of claim 8, where the first setting is associated with preventing a first group of content from being provided and the second setting is associated with a second group of content from being provided; and
   where, when determining that the second setting corresponds to the more restrictive setting, the processor is to:
      determine that the first group of content is included in the second group of content, and
      determine that the second setting corresponds to the more restrictive setting relative to the first setting based on the second group of content including the first group of content.

12. The first device of claim 8, where, when determining that the second setting corresponds to the more restrictive setting, the processor is to:
   determine that the second setting is associated with preventing a wider range of content from being provided relative to the first setting, and
   determine that the second setting corresponds to the more restrictive setting based on the second setting being associated with preventing the wider range of content.

13. The first device of claim 8, where, when determining that the second setting corresponds to the more restrictive setting, the processor is to:
   access preference information associated with a user associated with the first device,
   determine a particular type of content associated with the more restrictive setting based on the preference information,
   determine that the second setting is associated with preventing the particular type of content from being provided, and
   determine that the second setting corresponds to the more restrictive setting relative to the first setting based on the second setting being associated with preventing the particular type of content from being provided.

14. The first device of claim 8, where the processor is further to:
   provide, prior to the occurrence of the event, first content;
   determine, based on setting the parental control feature of the first device to the second setting, that the second setting prohibits providing the first content; and
   block, based on the second setting prohibiting providing the first content, the first content from being provided.

15. A non-transitory computer readable medium storing instructions, the instructions comprising:
   one or more instructions that, when executed by a processor of a first media client, cause the processor to:
      set a parental control feature of the first media client to a first setting;
      obtain information identifying a second setting of a parental control feature of a second, different media client;
      determine that the second setting corresponds to a more restrictive setting relative to the first setting;
      determine an occurrence of an event associated with the parental control feature; and
      set, based on the occurrence of the event and based on the second setting corresponding to the more restrictive setting, the parental control feature of the first media client to the second setting.

16. The non-transitory computer readable medium of claim 15, where the one or more instructions, that cause the processor to determine the occurrence of the event, cause the processor to:
   determine that no activity has occurred at the first media client during a particular period of time; and
   determine the occurrence of the event based on no activity having occurred at the first media client during the particular period of time.

17. The non-transitory computer readable medium of claim 15, where the one or more instructions, that cause the processor to determine the occurrence of the event, cause the processor to:
  determine that a display device, associated with the first media client, has been turned off, and
  determine the occurrence of the event based on the display device having been turned off.

18. The non-transitory computer readable medium of claim 15, where the first setting is associated with preventing a first group of content from being provided and the second setting is associated with a second group of content from being provided; and
  where the one or more instructions, that cause the processor to determine that the second setting corresponds to the more restrictive setting, cause the processor to:
    determine that the first group of content is included in the second group of content, and
    determine that the second setting corresponds to the more restrictive setting relative to the first setting based on the second group of content including the first group of content.

19. The non-transitory computer readable medium of claim 15, where the one or more instructions, that cause the processor to obtain the information identifying the second setting, cause the processor to:
  receive information identifying the second setting from the second media client.

20. The non-transitory computer readable medium of claim 15, where the one or more instructions, that cause the processor to obtain the information identifying the second setting, cause the processor to:
  receive preference information from a user via a user interface displayed on a display device associated with the first media client,
    the preference information including information identifying the first setting and the information identifying the second setting; and
  where the instructions further comprise:
    one or more instructions that, when executed by the processor, cause the processor to:
      send the information identifying the second setting to the second media client.

* * * * *